US012641381B2

(12) United States Patent
Pedersen et al.

(10) Patent No.: US 12,641,381 B2
(45) Date of Patent: May 26, 2026

(54) HEARING AID DEVICE FOR HANDS FREE COMMUNICATION

(71) Applicant: Oticon A/S, Smørum (DK)

(72) Inventors: Michael Syskind Pedersen, Smørum (DK); Jesper Jensen, Smørum (DK); Jan Mark De Haan, Smørum (DK)

(73) Assignee: Oticon A/S, Smørum (DK)

(*) Notice: Subject to any disclaimer, the term of this patent is extended or adjusted under 35 U.S.C. 154(b) by 598 days.

(21) Appl. No.: 18/310,992

(22) Filed: May 2, 2023

(65) Prior Publication Data

US 2023/0269549 A1 Aug. 24, 2023

Related U.S. Application Data

(60) Continuation of application No. 17/693,694, filed on Mar. 14, 2022, now Pat. No. 11,671,773, which is a (Continued)

(30) Foreign Application Priority Data

Dec. 6, 2013 (EP) .................................... 13196033

(51) Int. Cl.
*H04R 25/00* (2006.01)
*H04R 1/10* (2006.01)

(52) U.S. Cl.
CPC ........... *H04R 25/554* (2013.01); *H04R 25/30* (2013.01); *H04R 25/407* (2013.01); *H04R 25/43* (2013.01);
(Continued)

(58) Field of Classification Search
CPC .... H04R 1/1083; H04R 25/30; H04R 25/305; H04R 25/407; H04R 25/43; H04R 25/552;
(Continued)

(56) References Cited

U.S. PATENT DOCUMENTS 5,511,128 A 4/1996 Lindemann
6,001,131 A 12/1999 Raman
(Continued)

FOREIGN PATENT DOCUMENTS

EP 1519625 A2 3/2005
EP 1599742 B1 4/2009
(Continued)

OTHER PUBLICATIONS

U.S. Appl. No. 17/693,694, filed Mar. 14, 2022.
(Continued)

*Primary Examiner* — Huyen D Le
(74) *Attorney, Agent, or Firm* — Birch, Stewart, Kolasch & Birch, LLP

(57) ABSTRACT

The present invention regards a hearing aid device at least one environment sound input, a wireless sound input, an output transducer, electric circuitry, a transmitter unit, and a dedicated beamformer-noise-reduction-system. The hearing aid device is configured to be worn in or at an ear of a user. The at least one environment sound input is configured to receive sound and to generate electrical sound signals representing sound. The wireless sound input is configured to receive wireless sound signals. The output transducer is configured to stimulate hearing of the hearing aid device user. The transmitter unit is configured to transmit signals representing sound and/or voice. The dedicated beamformer-noise-reduction-system is configured to retrieve a user voice signal representing the voice of a user from the electrical sound signals. The wireless sound input is configured to be wirelessly connected to a communication device and to receive wireless sound signals from the communication device. The transmitter unit is configured to be wirelessly connected to the communication device and to transmit the user voice signal to the communication device.

20 Claims, 4 Drawing Sheets

Related U.S. Application Data continuation of application No. 17/005,972, filed on Aug. 28, 2020, now Pat. No. 11,304,014, which is a division of application No. 16/425,670, filed on May 29, 2019, now Pat. No. 10,791,402, which is a continuation of application No. 14/561,960, filed on Dec. 5, 2014, now Pat. No. 10,341,786.

(52) U.S. Cl.
CPC ......... *H04R 25/552* (2013.01); *H04R 1/1083* (2013.01); *H04R 25/305* (2013.01); *H04R 2225/39* (2013.01); *H04R 2225/41* (2013.01); *H04R 2225/55* (2013.01); *H04R 2499/11* (2013.01)

(58) Field of Classification Search
CPC .............. H04R 25/554; H04R 2225/39; H04R 2225/41; H04R 2225/55; H04R 2499/11
See application file for complete search history.

(56) References Cited

U.S. PATENT DOCUMENTS

| | | | | |
|---|---|---|---|---|
| 6,694,034 | B2 | 2/2004 | Julstrom et al. | |
| 7,609,842 | B2 | 10/2009 | Sipkema et al. | |
| 7,738,666 | B2 | 6/2010 | Marquis | |
| 8,009,849 | B2 | 8/2011 | Enzmann | |
| 8,077,892 | B2 | 12/2011 | Diijkstra | |
| 8,229,127 | B2 | 7/2012 | Jorgensen | |
| 8,606,571 | B1 | 12/2013 | Every | |
| 9,439,005 | B2 | 9/2016 | Jensen | |
| 9,532,147 | B2 * | 12/2016 | Scheller | H04R 25/554 |
| 9,860,656 | B2 | 1/2018 | Jensen | |
| 10,341,786 | B2 | 7/2019 | Pedersen | |
| 10,580,437 | B2 | 3/2020 | Jensen et al. | |
| 10,791,402 | B2 | 9/2020 | Pedersen et al. | |
| 11,304,014 | B2 | 4/2022 | Pedersen et al. | |
| 12,532,133 | B2 * | 1/2026 | Rohde | H04R 25/505 |
| 2003/0059076 | A1 | 3/2003 | Martin | |
| 2003/0118197 | A1 | 6/2003 | Nagayasu et al. | |
| 2005/0255843 | A1 | 11/2005 | Hilpisch et al. | |
| 2007/0189561 | A1 | 8/2007 | Dijkstra et al. | |
| 2007/0282393 | A1 | 12/2007 | Marquis | |
| 2008/0101635 | A1 | 5/2008 | Dijkstra | |
| 2008/0152167 | A1 | 6/2008 | Taenzer | |
| 2008/0201138 | A1 | 8/2008 | Visser et al. | |
| 2010/0070266 | A1 | 3/2010 | McNeill et al. | |
| 2011/0137649 | A1 | 6/2011 | Rasmussen et al. | |
| 2012/0020485 | A1 | 1/2012 | Visser | |
| 2012/0300958 | A1 | 11/2012 | Klemmensen | |
| 2013/0051656 | A1 | 2/2013 | Ito et al. | |
| 2014/0056435 | A1 | 2/2014 | Kjems | |
| 2014/0076301 | A1 | 3/2014 | Wang | |
| 2015/0139459 | A1 | 5/2015 | Olsen | |
| 2016/0112811 | A1 | 4/2016 | Jensen et al. | |
| 2020/0336846 | A1 * | 10/2020 | Rohde | H04R 25/554 |

FOREIGN PATENT DOCUMENTS

| | | | |
|---|---|---|---|
| EP | 2088802 | A1 | 8/2009 |
| EP | 2528358 | A1 | 11/2012 |
| WO | WO 2004/016037 | A1 | 2/2004 |
| WO | WO 2007/082579 | A2 | 7/2007 |

OTHER PUBLICATIONS

U.S. Appl. No. 17/005,972, filed Aug. 28, 2020.

U.S. Appl. No. 16/425,670, filed May 29, 2019.

U.S. Appl. No. 14/561,960, filed Dec. 5, 2014.

Brandstein et al., "Microphone Arrays: Signal Processing Techniques and Applications (Digital Processing)," Springer, ISBN 978-3-662-04619-7, 2001, pp. 20-21.

Dillon, "Hearing Aids," Thieme, 2001, pp. 24-28 and 188-195 (14 pages total).

Doclo et al., "Frequency-domain criterion for the speech distortion weighted multichannel Wiener filter for robust noise reduction," Speech Communication, vol. 49, 2007, pp. 636-656.

Gannot et al., "Theoretical Analysis of the General Transfer Function GSC," International Workshop Acoustic Echo Noise Control (WAENC), Darmstadt, Sep. 2001, 4 pages.

Kjems et al., "Maximum Likelihood Based Noise Covariance Matrix Estimation for Multi-Microphone Speech Enhancement," 20th European Signal Processing Conference (EUSIPCO 2012), Bucharest, Romania, Aug. 27-31, 2012, pp. 295-299, XP032254727.

Laugesen et al., "Design of a Microphone Array for Headsets," IEEE Workshop on Applications of Signal Processing to Audio and Acoustics, New Paltz, New York, Oct. 19-22, 2003, pp. 37-40.

Tashev et al., "Microphone Array for Headset with Spatial Noise Suppressor," Proceedings of 9th International Workshop on Acoustic, Echo and Noise Control (IWAENC), Sep. 1, 2005, pp. 217-220.

Vonlanthen et al., "Hearing Instrument Technology: for the Hearing Healthcare Professional," Third Edition, 2007, pp. 96-99 (3 pages total).

* cited by examiner

HEARING AID DEVICE FOR HANDS FREE COMMUNICATION

This application is a Continuation of application Ser. No. 17/693,694, filed Mar. 14, 2022, which is a Continuation of application Ser. No. 17/005,972, filed on Aug. 28, 2020 (now U.S. Pat. No. 11,304,014 issued Apr. 12, 2022), which is a Divisional of application Ser. No. 16/425,670, filed on May 29, 2019 (now U.S. Pat. No. 10,791,402 issued Sep. 29, 2020), which is a Continuation of application Ser. No. 14/561,960, filed on Dec. 5, 2014 (now U.S. Pat. No. 10,341,786 issued on Jul. 2, 2019), which claims priority under 35 U.S.C. § 119(a) to European Patent Application No. EP 13196033.8, filed on Dec. 6, 2013. Each of the above applications are hereby expressly incorporated by reference, in its entirety, into the present application.

The invention refers to a hearing aid device comprising an environment sound input, a wireless sound input, an output transducer, a dedicated beamformer-noise-reduction-system and electric circuitry, wherein the hearing aid device is configured to be connected to a communication device for receiving wireless sound signals and transmitting sound signals representing environment sound.

Hearing devices, such as hearing aids can be directly connected to other communication devices, e.g., a mobile phone. Hearing aids are typically worn in or at the ear (or partially implanted in the head) of a user and typically comprise a microphone, a speaker (receiver), an amplifier, a power source and electric circuitry. The hearing aids, which can directly connect to other communication devices, typically contain a transceiver unit, e.g., a Bluetooth transceiver or other wireless transceiver to directly connect the hearing aid with, e.g., a mobile phone. When making a phone call with the mobile phone the user holds the mobile phone in front of the mouth to use the microphone of the mobile phone (e.g. a SmartPhone), while the sound from the mobile phone is transmitted wirelessly to the hearing aid of the user.

In U.S. Pat. No. 6,001,131 a method and system for noise reduction are disclosed. Ambient noise immediately following speech is captured and the sample is used as basis for noise cancellation of the speech signal in a post-processing or real time processing mode. The method comprises the steps of classifying input frames as speech or noise, identifying a preselected number of frames of noise following speech, and disabling the use of subsequent frames for cancellation purposes. The preselected number of frames are utilized for estimating for cancellation on previously stored speech frames.

US 2010/0070266 A1 discloses a system comprising a voice activity detector (VAD), a memory, and a voice activity analyzer. The voice activity detector is configured to detect voice activity on at least one of a receive and a transmit channel in a communications system. The memory is configured to store outputs from the voice activity detector. The voice activity analyzer is in communication with the memory and configured to generate a performance metric comprising a duration of voice activity based on the voice activity detector outputs stored in the memory.

It is an object of the invention to provide an improved hearing aid device.

This object is achieved by a hearing aid device configured to be worn in or at an ear of a user comprising at least one environment sound input, a wireless sound input, an output transducer, electric circuitry, a transmitter unit, and a dedicated beamformer-noise-reduction-system. The electric circuitry is—at least in specific modes of operation of the hearing device—operationally coupled to the at least one environment sound input, to the wireless sound input, to the output transducer, to the transmitter unit, and to the dedicated beamformer-noise-reduction-system. The at least one environment sound input is configured to receive sound and to generate an electrical sound signal representing sound. The wireless sound input is configured to receive wireless sound signals. The output transducer is configured to stimulate hearing of the hearing aid device user. The transmitter unit is configured to transmit signals representing sound and/or voice. The dedicated beamformer-noise-reduction-system is configured to retrieve a user voice signal representing the voice of the user from the electrical sound signal. The wireless sound input is configured to be wirelessly connected to a communication device and to receive wireless sound signals from the communication device. The transmitter unit is configured to be wirelessly connected to the communication device and to transmit the user voice signal to the communication device.

Generally, the term “user”—when used without reference to other devices—is taken to mean the ‘user of the hearing aid device’. Other ‘users’ may be referred to in relevant application scenarios according to the present disclosure, e.g. a far-end talker of a telephone conversation with the user of the hearing aid device, i.e. ‘the person at the other end’.

The ‘environment sound input’ generates in the hearing aid device ‘an electrical sound signal representing sound’, i.e. a signal representing sounds from the environment of the hearing aid user, be it noise, voice (e.g. the user’s own voice and/or other voices), music, etc., or mixtures thereof.

The ‘wireless sound input’ receives ‘wireless sound signals’ in the hearing aid device. The ‘wireless sound signals’ can e.g. represent music from a music player, voice (or other sound) signals from a remote microphone, voice (or other sound) signals from a remote end of a telephone connection, etc.

The term ‘beamformer-noise-reduction-system’ is taken to mean a system that combines or provides the features of (spatial) directionality and noise reduction, e.g. in the form of a multi-input (e.g. a multi-microphone) beamformer providing a weighted combination of the input signals in the form of a beamformed signal (e.g. an omni-directional or a directional or signal) followed by a single-channel noise reduction unit for further reducing noise in the beamformed signal, the weights applied to the input signals being termed the ‘beamformer weights’.

Preferably, at least one environment sound input of the hearing device comprises two or more environment inputs such as three or more. In an embodiment, one or more of the environment inputs of the hearing aid device is/are received (e.g. wired or wirelessly) from respective input transducers located separately from the hearing device, e.g. more than 0.05 m away for a housing of the hearing device, e.g. in another device, e.g. in a hearing device located at an opposite ear, or in an auxiliary device.

The electrical sound signals representing sound can also be transformed into, e.g., light signals or other means for data transmission during the processing of the sound signals. The light signals or other means for data transmission can for example be transmitted in the hearing aid device using glass fibres. In one embodiment the environment sound input is configured to transform acoustic sound waves received from the environment in light signals or other means for data transmission. Preferably, the environment sound input is configured to transform acoustic sound waves received from the environment in electrical sound signals. The output transducer is preferably configured to stimulate the hearing of a hearing impaired user and can for example be a speaker, a multi-electrode array of a cochlear implant, or any other output transducer with the ability to stimulate the hearing of a hearing impaired user (e.g. a vibrator of a hearing device attached to bones of the skull).

One aspect of the invention is that a communication device, e.g., a mobile phone, connected to a hearing aid device, e.g., a hearing aid, can be kept in a pocket or bag when making a phone call using the mobile phone, without the need of using one or both hands of a user to hold it in front of the mouth of the user to use the microphone of the mobile phone. Similarly, if communication between a hearing aid device and a mobile phone is conducted via an (auxiliary) intermediate device (e.g. for conversion from one transmission technology to another), the intermediate device does not need to be close to the mouth of the hearing aid device user, because microphone(s) of the intermediate device need not be used for picking up the user's voice. Another aspect is that the dedicated beamformer-noise-reduction-system allows to use the environment sound inputs, e.g., microphones, of the hearing aid device without significant loss of communication quality. Without the beamformer-noise-reduction-system the speech signal would be noisy, leading to poor communication quality, as the microphone or microphones of the hearing aid device are placed at a distance to the sound source, e.g., a mouth of the user of hearing aid device.

In an embodiment, the auxiliary or intermediate device is or comprises an audio gateway device adapted for receiving a multitude of audio signals (e.g. from an entertainment device, e.g. a TV or a music player, a telephone apparatus, e.g. a mobile telephone or a computer, e.g. a PC) and adapted for allowing the selection and/or combination of an appropriate one of the received audio signals (or combination of signals) for transmission to the hearing aid device(s). In an embodiment, the auxiliary or intermediate device is or comprises a remote control for controlling functionality and operation of the hearing aid device(s). In an embodiment, the function of a remote control is implemented in a SmartPhone, the SmartPhone possibly running an APP allowing to control the functionality of the hearing aid device(s) via the SmartPhone (the hearing aid device(s) comprising an appropriate wireless interface to the SmartPhone, e.g. based on Bluetooth or some other standardized or proprietary scheme).

In an embodiment, a distance between the sound source of the user's own voice and the environment sound input (input transducer, e.g. microphone) is larger than 5 cm, such as larger than 10 cm, such as larger than 15 cm. In an embodiment, a distance between the sound source of the user's own voice and the environment sound input (input transducer, e.g. microphone) is smaller than 25 cm, such as smaller than 20 cm.

Preferably, the hearing aid device is configured to be operated in various modes of operation, e.g., a communication mode, a wireless sound receiving mode, a telephony mode, a silent environment mode, a noisy environment mode, a normal listening mode, a user speaking mode, or another mode. The modes of operation are preferably controlled by algorithms, which are executable on the electric circuitry of the hearing aid device. The various modes may additionally or alternatively be controlled by the user via a user interface. The different modes preferably involve different values for the parameters used by the hearing aid device to process electrical sound signals, e.g., increasing and/or decreasing gain, applying noise reduction means, using beamforming means for spatial direction filtering or other functions. The different modes can also perform other functionalities, e.g., connecting to external devices, activating and/or deactivating parts or the whole hearing aid device, controlling the hearing aid device or further functionalities. The hearing aid device can also be configured to operate in two or more modes at the same time, e.g., by operating the two or more modes in parallel. Preferably, the communication mode causes the hearing aid device to establish a wireless connection between the hearing aid device and the communication device. A hearing aid device operating in the communication mode can further be configured to process sound received from the environment by, e.g., decreasing the overall sound level of the sound in the electrical sound signals, suppressing noise in the electrical sound signals or processing the electrical sound signals by other means. The hearing aid device operating in the communication mode is preferably configured to transmit the electrical sound signals and/or the user voice signal to the communication device and/or to provide electrical sound signals to the output transducer to stimulate the hearing of the user. The hearing aid device operating in the communication mode can also be configured to deactivate the transmitter unit and process the electrical sound signals in combination with a wirelessly received wireless sound signal in a way optimized for communication quality while still maintaining danger awareness of the user, e.g., by suppressing (or attenuating) disturbing background noise but maintaining selected sounds, e.g., alarms, police or fire-fighter car sound, human yells, or other sounds implying danger.

The modes of operation are preferably automatically activated in dependence of outputs of the hearing aid device, e.g., when a wireless sound signal is received by the wireless sound input, when a sound is received by the environment sound input, or when another 'mode of operation trigger event' occurs in the hearing aid device. The modes of operation are also preferably deactivated in dependence of mode of operation trigger events. The modes of operation can also be manually activated and/or deactivated by the user of the hearing aid device (e.g. via a user interface, e.g. a remote control, e.g. via an APP of a SmartPhone).

In an embodiment, the hearing aid device comprise(s) a TF-conversion unit for providing a time-frequency representation of an input signal (e.g. forming part of or inserted after input transducer(s), e.g. input transducers 14, 14' in FIG. 1). In an embodiment, the time-frequency representation comprises an array or map of corresponding complex or real values of the signal in question in a particular time and frequency range. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the frequency domain. In an embodiment, the frequency range considered by the hearing aid device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, a signal of the forward and/or analysis path of the hearing aid device is split into a number NI of frequency bands, where NI is e.g. larger than 5, such as larger than 10, such as larger than 50, such as larger than 100, such as larger than 500, at least some of which are processed individually. In an embodiment, the hearing aid device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the hearing aid device comprises a time-frequency to time conversion unit (e.g. a synthesis filter bank) to provide an output signal in the time domain from a number of band split input signals.

In a preferred embodiment the hearing aid device comprises a voice activity detection unit. The voice activity detection unit preferably comprises an own voice detector configured to detect if a voice signal of the user is present in the electrical sound signal. In an embodiment, voice-activity detection (VAD) is implemented as a binary indication: either voice present or absent. In an alternative embodiment, voice activity detection is indicated by a speech presence probability, i.e., a number between 0 and 1. This advantageously allows the use of "soft-decisions" rather than binary decisions. Voice detection may be based on an analysis of a full-band representation of the sound signal in question. Alternatively, voice detection may be based on an analysis of a split band representation of the sound signal (e.g. of all or selected frequency bands of the sound signal).

The hearing aid device is further preferably configured to activate the wireless sound receiving mode when the wireless sound input is receiving wireless sound signals. In an embodiment, the hearing aid device is configured to activate the wireless sound receiving mode when the wireless sound input is receiving wireless sound signals and when the voice activity detection unit detects an absence of a user voice signal in the electrical sound signal with a higher probability (e.g. more than 50%, or more than 80%) or with certainty. It is likely that the user will listen to the received wireless sound signal and will not generate user voice signals during times where a voice signal is present in the wireless sound signal. Preferably the hearing aid device operating in the wireless sound receiving mode is configured to transmit electrical sound signals using the transmitter unit to the communication device with a decreased probability, e.g., by increasing a sound level threshold and/or signal-to-noise ratio threshold which needs to be overcome to transmit an electrical sound signal and/or user voice signal. The hearing aid device operating in the wireless sound receiving mode can also be configured to process the electrical sound signals by the electric circuitry by suppressing (or attenuating) sound from the environment received by the environment sound input and/or by optimizing communication quality, e.g., decreasing sound level of the sound from the environment, possibly while still maintaining danger awareness of the user. The use of a wireless sound receiving mode can allow to reduce the computational demands and therefore the energy consumption of the hearing aid device. Preferably the wireless sound receiving mode is only activated when the sound level and/or signal-to-noise ratio of the wirelessly received wireless sound signal is above a predetermined threshold. The voice activity detection unit can be a unit of the electric circuitry or a voice activity detection (VAD) algorithm executable on the electric circuitry.

In one embodiment the dedicated beamformer-noise-reduction-system comprises a beamformer. The beamformer is preferably configured to process the electrical sound signals by suppressing predetermined spatial directions of the electrical sound signals (e.g. using a look vector) generating a spatial sound signal (or beamformed signal). The spatial sound signal has an improved signal-to-noise ratio, as noise from other spatial directions than from the direction of a target sound source (defined by the look vector) is suppressed by the beamformer. In one embodiment, the hearing aid device comprises a memory configured to store data, e.g., predetermined spatial direction parameters adapted to cause a beamformer to suppress sound from other spatial directions than the spatial directions determined by values of the predetermined spatial direction parameters, such as the look vector, an inter-environment sound input noise covariance matrix for the current acoustic environment, a beamformer weight vector, a target sound covariance matrix, or further predetermined spatial direction parameters. The beamformer is preferably configured to use the values of the predetermined spatial direction parameters to adapt the predetermined spatial directions of the electrical sound signal, which are suppressed by the beamformer when the beamformer processes the electrical sound signals.

Initial predetermined spatial direction parameters are preferably determined in a beamformer dummy head model system. The beamformer dummy head model system preferably comprises a dummy head with a dummy target sound source (e.g. located at the mouth of the dummy head). The location of the dummy target sound source is preferably fixed relative to the at least one environment sound input of the hearing aid device. The location coordinates of the fixed location of the target sound source or spatial direction parameters corresponding to the location of the target sound source are preferably stored in the memory. The dummy target sound source is preferably configured to produce training voice signals representing a predetermined voice and/or other training signals, e.g., a white noise signal having frequency content between a minimum frequency, preferably above 20 Hz and a maximum frequency, preferably below 20 kHz, which allow to determine the spatial direction of the dummy target sound source (e.g. located at the mouth of the dummy head) to at least one environment sound input of the hearing aid device and/or the location of the dummy target sound source relative to at least one environment sound input of the hearing aid device mounted on the dummy head.

In an embodiment, the acoustic transfer function from dummy head sound source (i.e. mouth) to each environment sound input (e.g. microphone) of the hearing aid device is measured/estimated. From the transfer function, the direction of the source may be determined, but this is not necessary. From the estimated transfer functions, and an estimate of the inter-microphone covariance matrix for the noise (see more below), one is able to determine the optimal (in a Minimum Mean Square Error (mmse) sense) beamformer weights. The beamformer is preferably configured to suppress sound signals from all spatial directions except the spatial direction of the training voice signals and/or training signals, i.e., the location of the dummy target sound source. The beamformer can be a unit of the electric circuitry or a beamformer algorithm executable on the electric circuitry.

The memory is preferably further configured to store modes of operation and/or algorithms which can be executed on the electric circuitry.

In a preferred embodiment the electric circuitry is configured to estimate a noise power spectral density (psd) of a disturbing background noise from sound received with the at least one environment sound input. Preferably the electric circuitry is configured to estimate the noise power spectral density of a disturbing background noise from sound received with the at least one environment sound input when the voice activity detection unit detects an absence of a voice signal of the user in the electrical sound signals (or detects such absence with a high probability, e.g. ≥50% or ≥60%, e.g. on a frequency band level). Preferably the values of the predetermined spatial direction parameters are determined in dependence of or by the noise power spectral density of the disturbing background noise. When voice is absent, i.e., a noise-only situation, the inter-microphone noise covariance matrix is measured/estimated. This may be seen as a "finger-print" of the noise situation. This measurement is independent of the look-vector/the transfer function from target source to the microphone(s). When combining the estimated noise covariance matrix with the pre-determined target inter-microphone transfer function (look vector), the optimal (in an mmse sense) settings (e.g., beamformer weights) for a multi-mic noise reduction system can be determined.

In a preferred embodiment, the beamformer-noise-reduction-system comprises a single channel noise reduction unit. The single channel noise reduction unit is preferably configured to reduce noise in the electrical sound signals. In an embodiment, the single channel noise reduction unit is configured to reduce noise in the spatial sound signal and to provide a noise reduced spatial sound signal, here the 'user voice signal'. Preferably the single channel noise reduction unit is configured to use a predetermined noise signal representing disturbing background noise from sound received with the at least one environment sound input to reduce the noise in the electrical sound signals. The noise reduction can for example be performed by subtracting the predetermined noise signal from the electrical sound signal. Preferably a predetermined noise signal is determined by sound received by the at least one environment sound input when the voice activity detection unit detects an absence of a hearing aid device user voice signal in the electrical sound signals (or detects the user's voice with a low probability). In an embodiment, the single channel noise reduction unit comprises an algorithm configured to track the noise power spectrum during speech presence (in which case the noise psd is not "pre-determined", but adapts according to the noise environment). Preferably, the memory is configured to store predetermined noise signals and to provide them to the single channel noise reduction unit. The single channel noise reduction unit can be a unit of the electric circuitry or a single channel noise reduction algorithm executable on the electric circuitry.

In one embodiment the hearing aid device comprises a switch configured to establish a wireless connection between the hearing aid device and the communication device. Preferably the switch is adapted to be activated by a user. In one embodiment the switch is configured to activate the communication mode. Preferably the communication mode causes the hearing aid device to establish a wireless connection between the hearing aid device and the communication device. The switch can also be configured to activate other modes, e.g., the wireless sound receiving mode, the silent environment mode, the noisy environment mode, the user speaking mode or other modes.

In a preferred embodiment the hearing aid device is configured to be connected to a mobile phone. The mobile phone preferably comprises at least a receiver unit, a wireless interface to the public telephone network, and a transmitter unit. The receiver unit is preferably configured to receive sound signals from the hearing aid device. The wireless interface to the public telephone network is preferably configured to transmit sound signals to other telephones or devices which are part of the public telephone network, e.g., landline telephones, mobile phones, laptop computers, tablet computers, personal computers, or other devices that have an interface to the public telephone network. The public telephone network can include the public switched telephone network (PSTN), including the public cellular network. The transmitter unit of the mobile phone is preferably configured to transmit wireless sound signals received by the wireless interface to the public telephone network via an antenna to the wireless sound input of the hearing aid device. The transmitter unit and receiver unit of the mobile phone can also be one transceiver unit, e.g., a transceiver, such as a Bluetooth transceiver, an infrared transceiver, a wireless transceiver, or similar device. The transmitter unit and receiver unit of the mobile phone are preferably configured to be used for local communication. The interface to the public telephone network is preferably configured to be used for communication with base stations of the public telephone network to allow communication within the public telephone network.

In one embodiment, the hearing aid device is configured to determine a location of a target sound source of the user voice signal, e.g., a mouth of a user, relative to the at least one environment sound input of the hearing aid device and to determine spatial direction parameters corresponding to the location of the target sound source relative to the at least one environment sound input. In an embodiment, the memory is configured to store the coordinates of the location and the values of the spatial direction parameters. The memory can be configured to fix the location of the target sound source, e.g., preventing the change of the coordinates of the location of the target sound source or allowing only a limited change of the coordinates of the location of the target sound source when a new location is determined. In an embodiment, the memory is configured to fix the initial location of the dummy target sound source, which can be selected by a user as an alternative to the location of the target sound source of the user voice signal determined by the hearing aid device. The memory can also be configured to store a location of the target sound source relative to the at least one environment sound input each time the location is determined or if a determination of the location of the target sound source relative to the at least one environment sound input is manually initiated by the user. The values of the predetermined spatial direction parameters are preferably determined in correspondence to the location of the target sound source relative to the at least one environment sound input of the hearing aid device. The hearing aid device is preferably configured to use the values of the initial predetermined spatial direction parameters determined using the dummy head model system instead of the values of the predetermined spatial direction parameters determined for the target sound source of the user voice signal, when the relative deviation of the coordinates between the determined location of the target sound source relative to the at least one environment sound input is unrealistically large compared to the location of the target sound source relative to the at least one environment sound input determined by the hearing aid device. The deviation between the initial location and a location determined by the hearing aid device is expected to be in the range of up to 5 cm, preferably 3 cm, most preferably 1 cm for all coordinate axes. The coordinate system here describes the relative locations of the target sound source to the environment sound input or environment sound inputs of the hearing aid device or hearing aid devices.

Preferably, however, the hearing aid is configured to store the (relative) acoustic transfer function(s) from a target sound source to the environment sound input(s) (microphone(s)), and "distances" (e.g. as given by a mathematical or statistical distance measure) between filter weights or look vectors of the pre-determined and the newly estimated target sound source.

In a preferred embodiment of the hearing aid device, the beamformer is configured to provide a spatial sound signal corresponding to the location of the target sound source relative to the environment sound input to the voice activity detection unit. The voice activity detection unit is configured to detect whether (or with which probability) a voice of the user, i.e., a user voice signal, is present in the spatial sound signal and/or to detect the points in time when the voice of the user is present in the spatial sound signal, meaning points in time where the user speaks (with a high probability). The hearing aid device is preferably configured to determine a mode of operation, e.g., the normal listening mode or the user speaking mode, in dependence of the output of the voice activity detection unit. The hearing aid device operating in the normal listening mode is preferably configured to receive sound from the environment using the at least one environment sound input and to provide a processed electrical sound signal to the output transducer to stimulate the hearing of the user. The electrical sound signal in the normal listening mode is preferably processed by the electric circuitry in a way to optimize the listening experience of the user, e.g., by reducing noise and increasing signal-to-noise ratio and/or sound level of the electrical sound signal. The hearing aid device operating in the user speaking mode is preferably configured to suppress (attenuate) the user voice signal of the user in the electrical sound signal of the hearing aid device used to stimulate the hearing of the user.

The hearing aid device operating in the user speaking mode can further be configured to determine the location (the acoustic transfer function) of the target sound source using an adaptive beamformer. The adaptive beamformer is preferably configured to determine a look vector, i.e., the (relative) acoustic transfer function from sound source to each microphone, while the hearing aid device is in operation and preferably while a voice signal is present or dominant (present with a high probability, e.g. ≥70%) in the spatial sound signal. The electric circuitry is preferably configured to estimate user voice inter-environment sound input (e.g. microphone) covariance matrices and to determine an eigenvector corresponding to a dominant eigenvalue of the covariance matrix, when the voice of the user is detected. The eigenvector corresponding to the dominant eigenvalue of the covariance matrix is the look vector d. The look vector depends on the relative location of a user's mouth to his ears (where the hearing aid device is located), i.e., the location of the target sound source relative to the environment sound inputs, meaning that the look vector is user dependent and does not depend on the acoustic environment. The look vector therefore represents an estimate of the transfer function from the target sound source to the environment sound inputs (each microphone). In the present context, the look vector is typically relatively constant over time, as the location of the user's mouth to the user's ears (hearing aid devices) is typically relatively fixed. Only the movement of the hearing aid device in an ear of the user can lead to a slightly changed location of the mouth of the user relative to the environment sound inputs. The initial predetermined spatial direction parameters were determined in a dummy head model system, with a dummy head, which corresponds to an average male human, female human or human head. Therefore the initial predetermined spatial direction parameters (transfer functions) will only slightly change from one user to another user, as heads of users typically differ only in a relatively small range, e.g. inducing changes in the transfer functions corresponding to a difference range of up to 5 cm, preferably 3 cm, most preferably 1 cm deviation in all three location coordinates of the target sound source relative to the environment sound input(s) of the hearing aid device. The hearing aid device is preferably configured to determine a new look vector at points in time, when the electrical sound signals are dominated by the user's voice, e.g., when at least one of the electrical sound signals and/or the spatial sound signal has a signal-to-noise ratio and/or sound level of voice of the user above a predetermined threshold. The adjustments of the look vector preferably improve the adaptive beamformer while the hearing aid device is in operation.

The invention further resides in a method for using a hearing aid device. The method can also be performed independent of the hearing aid device, e.g., for processing sound from the environment and a wireless sound signal. The method comprises the following steps. Receive a sound and generate electrical sound signals representing sound, e.g., by using at least two environment sound inputs (e.g. microphones). Optionally (or in a specific communication mode) establish a wireless connection, e.g., to a communication device. Determine if a wireless sound signal is received. Activate a first processing scheme if a wireless sound signal is received and activate a second processing scheme if no wireless sound signal is received. The first processing scheme preferably comprises the steps of using the electrical sound signals (preferably when the voice of the user of the hearing aid device is not detected (or has a low probability) in the electrical sound signal) to update a noise signal representing noise used for noise reduction and using the noise signal to update values of predetermined spatial direction parameters. The second processing scheme preferably comprises the steps of determining if the electrical sound signals comprise a voice signal representing voice, e.g., of a user (of the hearing aid device). Preferably the second processing scheme comprises a step of activating the first processing scheme if a voice signal of the user is absent (or detected with a low probability) in the electrical sound signals and activating a noise reduction scheme if the electrical sound signals comprise a voice signal (with a high probability), e.g., of the user. The noise reduction scheme preferably comprises the steps of using the electrical sound signals to update the values of the predetermined spatial direction parameters (acoustic transfer functions), retrieving a user voice signal representing the user voice from the electrical sound signals, e.g., using the dedicated beamformer-noise-reduction-system, and optionally transmitting the user voice signal, e.g., to the communication device. A spatial sound signal representing spatial sound is preferably generated from the electrical sound signals using the predetermined spatial direction parameters and a user voice signal is preferably generated from the spatial sound signal using the noise signal to reduce noise in the spatial sound signal. In the above mentioned embodiment of the method the case is considered, that no voice of a user is received by the environment sound input if a wireless sound signal is received. It is also possible that the first processing scheme is only activated when the wireless sound signal overcomes a predetermined signal-to-noise ratio threshold and/or sound level threshold. Alternatively or additionally the first processing scheme can be activated when the presence of a voice is detected in the wireless sound signal, e.g., by the voice activity detection unit.

An alternative embodiment of a method uses the hearing aid device as an own-voice detector. The method can also be applied on other devices to use them as own-voice detectors. The method comprises the following steps. Receive a sound from the environment in the environment sound inputs. Generate electrical sound signals representing the sound from the environment. Use of the beamformer to process the electrical sound signals, which generates a spatial sound signal in dependence of predetermined spatial direction parameters, i.e., in dependence of the look vector. An optional step can be to use the single channel noise reduction unit to reduce noise in the spatial sound signal to increase the signal-to-noise ratio of the spatial sound signal, e.g., by subtracting a predetermined spatial noise signal from the spatial sound signal. A predetermined spatial noise signal can be determined by determining a spatial sound signal when a voice signal is absent in the spatial sound signal, meaning when the user is not speaking. One step is preferably the use of the voice activity detection unit to detect whether a user voice signal of a user is present in the spatial sound signal. Alternatively, the voice activity detection unit can also be used to determine whether the user voice signal of a user overcomes a predetermined signal-to-noise ratio threshold and/or sound signal level threshold. Activate a mode of operation in dependence of the outcome of the voice activity detection, i.e., activating the normal listening mode, if no voice signal is present in the spatial sound signal and activating the user speaking mode, if a voice signal is present in the spatial sound signal. If a wireless sound signal is received additionally to the voice signal in the spatial sound signal the method is preferably adapted to activate the communication mode and/or the user speaking mode.

Additionally the beamformer can be an adaptive beamformer. A preferred embodiment of the alternative embodiment of the method is to train the hearing aid device as an own-voice detector. The method can also be used on other devices to train the devices as own-voice detectors. In this case the alternative embodiment of the method further comprises the following steps. If a voice signal is present in the spatial sound signal, determine an estimate of the user voice inter-environment sound input (e.g. inter-microphone) covariance matrices and the eigenvector corresponding to the dominant eigenvalue of the covariance matrix. This eigenvector is the look vector. This procedure of finding the dominant eigenvector of the target covariance matrix should only be seen as an example. Other, computationally cheaper, methods exist: e.g. to simply use one column of the target covariance matrix. The look vector is then combined with an estimate of the noise-only inter-microphone covariance matrix to update the characteristics of the optimal adaptive beamformer. The beamformer can be an algorithm performed on the electric circuitry or a unit in the hearing aid device. The spatial direction of the adaptive beamformer is preferably continuously and/or iteratively improved when the method is in use.

In a preferred embodiment the methods are used in the hearing aid device. Preferably at least some of the steps of one of the methods are used to train the hearing aid device to be used as an own-voice detector.

A further aspect of the invention is that the invention can be used to train the hearing aid device to detect the voice of the user, allowing the use of the invention as an improved own-voice detection unit. The invention can also be used for designing a trained, user-specific, and improved own-voice detection algorithm, which can be used in hearing aids for various purposes. The method detects the voice of the user and adapts the beamformer to improve the signal-to-noise ratio of the user voice signal while the method is in use.

In one embodiment of the hearing aid device the electric circuitry comprises a jawbone movement detection unit. The jawbone movement detection unit is preferably configured to detect a jawbone movement of a user resembling a jawbone movement for a generation of sound and/or voice by the user. Preferably the electric circuitry is configured to activate the transmitter unit only when a jawbone movement of the user resembling a jawbone movement for a generation of sound by the user is detected by the jawbone movement detection unit. Alternatively or additionally, the hearing aid device can comprise a physiological sensor. The physiological sensor is preferably configured to detect voice signals transmitted by bone conduction to determine whether the user of the hearing aid device speaks.

In the present context, a 'hearing aid device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing aid device' further refers to a device such as an earphone or a headset adapted to receive audio signals electronically, possibly modifying the audio signals and providing the possibly modified audio signals as audible signals to at least one of the user's ears.

Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing aid device may comprise a single unit or several units communicating (e.g. optically and/or electronically) with each other. In an embodiment, the input transducer(s) (e.g. microphone(s)) and a (substantial) part of the processing (e.g. the beamforming-noise reduction) takes place in separate units of the hearing aid device, in which case communication links of appropriate bandwidth between the different parts of the hearing aid device should be available.

More generally, a hearing aid device comprises an input transducer for receiving an acoustic signal from a user's surroundings and for providing a corresponding input audio signal and/or a receiver for electronically (i.e. wired or wirelessly) receiving an input audio signal, a signal processing circuit for processing the input audio signal and an output unit for providing an audible signal to the user in dependence on the processed audio signal. In some hearing aid devices, an amplifier may constitute the signal processing circuit. In some hearing aid devices, the output unit may comprise an output transducer, such as e.g. a loudspeaker for providing an air-borne acoustic signal or a vibrator for providing a structure-borne or liquid-borne acoustic signal. In some hearing aid devices, the output unit may comprise one or more output electrodes for providing electric signals.

In some hearing aid devices, the vibrator may be adapted to provide a structure-borne acoustic signal transcutaneously or percutaneously to the skull bone. In some hearing aid devices, the vibrator may be implanted in the middle ear and/or in the inner ear. In some hearing aid devices, the vibrator may be adapted to provide a structure-borne acoustic signal to a middle-ear bone and/or to the cochlea. In some hearing aid devices, the vibrator may be adapted to provide a liquid-borne acoustic signal to the cochlear liquid, e.g. through the oval window. In some hearing aid devices, the output electrodes may be implanted in the cochlea or on the inside of the skull bone and may be adapted to provide the electric signals to the hair cells of the cochlea, to one or more hearing nerves, to the auditory cortex and/or to other parts of the cerebral cortex.

A 'hearing aid system' refers to a system comprising one or two hearing aid devices, and a 'binaural hearing aid system' refers to a system comprising one or two hearing aid devices and being adapted to cooperatively provide audible signals to both of the user's ears via a first communication link. Hearing aid systems or binaural hearing aid systems may further comprise 'auxiliary devices', which communicate with the hearing aid devices via a second communication link, and affect and/or benefit from the function of the hearing aid devices. Auxiliary devices may be e.g. remote controls, audio gateway devices, mobile phones (e.g. SmartPhones), public-address systems, car audio systems or music players. Hearing aid devices, hearing aid systems or binaural hearing aid systems may e.g. be used for compensating for a hearing-impaired person's loss of hearing capability, augmenting or protecting a normal-hearing person's hearing capability and/or conveying electronic audio signals to a person.

In an embodiment, a separate auxiliary device forms part of the hearing aid device, in the sense that part of the processing takes place in the auxiliary device (e.g. the beamforming-noise reduction). In such case, a communication link of appropriate bandwidth between the different parts of the hearing aid device should be available.

In an embodiment, the first communication link between the hearing aid devices is an inductive link. An inductive link is e.g. based on mutual inductive coupling between respective inductor coils of the first and second hearing aid devices. In an embodiment, the frequencies used to establish the first communication link between the first and hearing aid devices are relatively low, e.g. below 100 MHz, e.g. located in a range from 1 MHz to 50 MHz, e.g. below 10 MHz. In an embodiment, the first communication link is based on a standardized or proprietary technology. In an embodiment, the first communication link is based on NFC or RuBee. In an embodiment, the first communication link is based on a proprietary protocol, e.g. as defined by US 2005/0255843 A1.

In an embodiment, the second communication link between a hearing aid device and an auxiliary device is based on radiated fields. In an embodiment, the second communication link is based on a standardized or proprietary technology. In an embodiment, the second communication link is based on Bluetooth technology (e.g. Bluetooth Low-Energy technology). In an embodiment, the communication protocol or standard of the second communication link is configurable, e.g. between a Bluetooth SIG Specification and one or more other standard or proprietary protocols (e.g. a modified version of Bluetooth, e.g. Bluetooth Low Energy modified to comprise an audio layer). In an embodiment, the communication protocol or standard of the second communication link of the hearing aid device is classic Bluetooth as specified by the Bluetooth Special Interest Group (SIG). In an embodiment, the communication protocol or standard of the second communication link of the hearing aid device is another standard or proprietary protocol (e.g. a modified version of Bluetooth, e.g. Bluetooth Low Energy modified to comprise an audio layer).

The present invention will be more fully understood from the following detailed description of embodiments thereof, taken together with the drawings in which.

Figure 1:
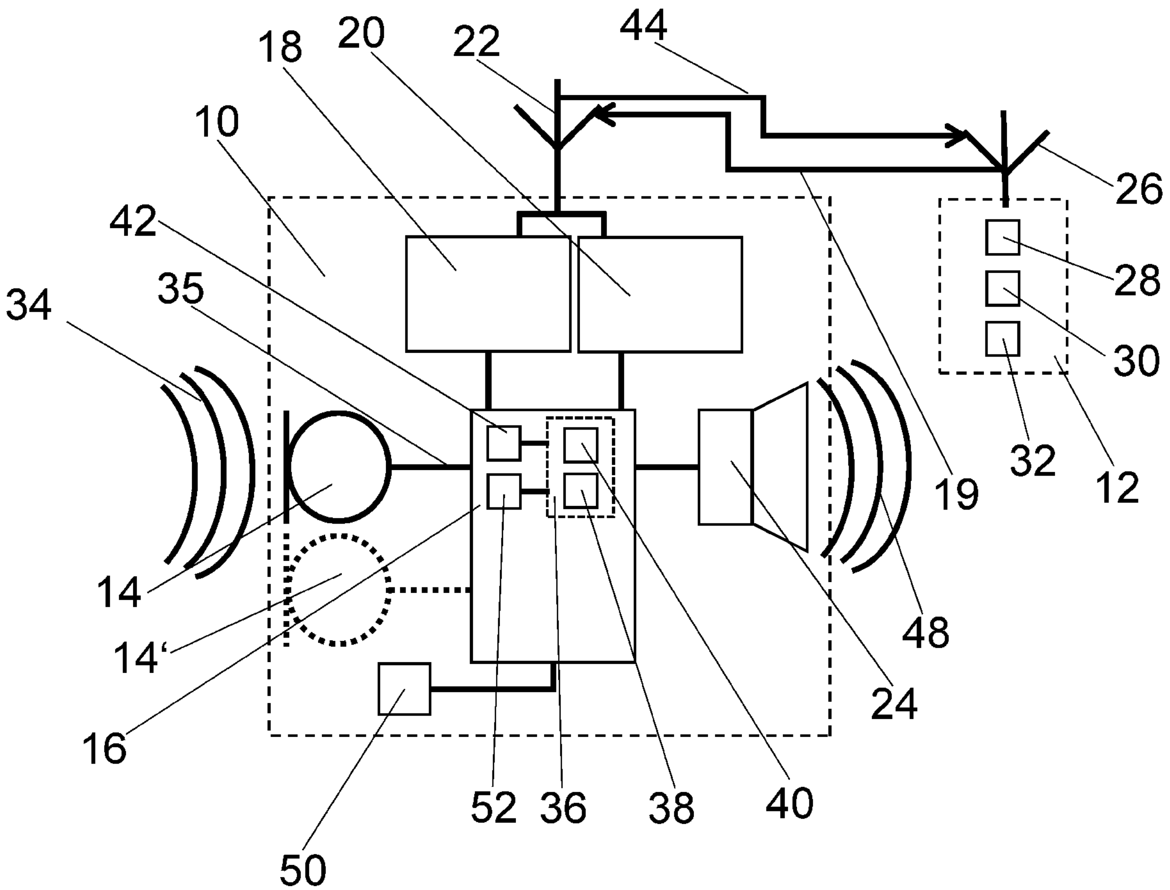
FIG. 1 shows a schematic illustration of a first embodiment of a hearing aid device wirelessly connected to a mobile phone.

FIG. 1 shows a hearing aid device 10 wirelessly connected to a mobile phone 12. The hearing aid device 10 comprises a first microphone 14, a second microphone 14', electric circuitry 16, a wireless sound input 18, a transmitter unit 20, an antenna 22, and a (loud)speaker 24. The mobile phone 12 comprises an antenna 26, a transmitter unit 28, a receiver unit 30, and an interface to a public telephone network 32. The hearing aid device 10 can run several modes of operation, e.g., a communication mode, a wireless sound receiving mode, a silent environment mode, a noisy environment mode, a normal listening mode, a user speaking mode or another mode. The hearing aid device 10 can also comprise further processing units common in hearing aid devices 10, e.g., a spectral filter bank for dividing electrical sound signals in frequency bands, e.g. an analysis filter bank, amplifiers, analog-to-digital converters, digital-to-analog converters, a synthesis filter bank, an electrical sound signals combination unit or other common processing units used in hearing aid devices (e.g. a feedback estimation/reduction unit, not shown).

Incoming sound 34 is received by the microphones 14 and 14' of the hearing aid device 10. The microphones 14 and 14' generate electrical sound signals 35 representing the incoming sound 34. The electrical sound signals 35 can be divided in frequency bands by the spectral filterbank (not shown) (in which case the subsequent analysis and/or processing of the band split signal is performed for each (or selected) frequency subband. For example, a VAD decision could then be a local per-frequency band decision). The electrical sound signals 35 are provided to the electric circuitry 16. The electric circuitry 16 comprises a dedicated beamformer-noise-reduction-system 36, which comprises a beamformer (Beamformer) 38 and a single channel noise reduction unit (Single-Channel Noise Reduction) 40, and which is connected to a voice activity detection unit 42. The electrical sound signals 35 are processed in the electric circuitry 16, which generates a user voice signal 44, if a voice of a user 46 (see FIG. 2) is present in at least one of the electrical sound signals 35 (or according to a predefined scheme, if working on a band split signal, e.g. if a user's voice is detected in a majority of the analysed frequency bands). When in the communication mode, the user voice signal 44 is provided to the transmitter unit 20, which uses the antenna 22 to wirelessly connect to the antenna 26 of the mobile phone 12 and to transmit the user voice signal 44 to the mobile phone 12. The receiver unit 28 of the mobile phone 12 receives the user voice signal 44 and provides it to the interface to the public telephone network 32, which is connected to another communication device, e.g., a base station of the public telephone network, another mobile phone, a telephone, a personal computer, a tablet, or any other device, which is part of the public telephone network. The hearing aid device 10 can also be configured to transmit electrical sound signals 35, if a voice of the user 46 is absent in the electrical sound signals 35, e.g., transmitting music or other non-speech sound (e.g. in an environment monitoring mode, where a current environment sound signal picked up by the hearing aid device is transmitted to another device, e.g. the mobile phone 12 and/or to another device via the public telephone network).

The processing of the electrical sound signals 35 in the electric circuitry 16 is performed as follows. The electrical sound signals 35 are first analysed in the voice activity detection unit 42, which is further connected to the wireless sound input 18. If a wireless sound signal 19 is received by the wireless sound input 18 the communication mode is activated. In the communication mode the voice activity detection unit 42 is configured to detect an absence of a voice signal in the electrical sound signal 35. It is assumed in this embodiment of the communication mode, that receiving a wireless sound signal 19 corresponds to the user 46 listening during communication. The voice activity detection unit 42 can also be configured to detect an absence of a voice signal in the electrical sound signal 35 with a higher probability if the wireless sound input 18 receives a wireless sound signal 19. Receiving a wireless sound signal 19 here means, that a wireless sound signal 19 is received, which has a signal-to-noise ratio and/or sound level above a predetermined threshold. If no wireless sound signal 19 is received by the wireless sound input 18 the voice activity detection unit 42 detects whether a voice signal is present in the electrical sound signals 35. If the voice activity detection unit 42 detects a voice signal of a user 46 (see FIG. 2) in the electrical sound signals 35, the user speaking mode can be activated in parallel to the communication mode. The voice detection is performed according to methods known in the art, e.g., by using means to detect whether harmonic structure and synchronous energy is present in the electrical sound signals 35, which indicates a voice signal, as vowels have unique characteristics consisting of a fundamental tone and a number of harmonics showing up synchronously in the frequencies above the fundamental tone. The voice activity detection unit 42 can be configured to especially detect the voice of the user, i.e., own-voice or user voice signal, e.g., by comparison to training voice patterns received by the user 46 of the hearing aid device 10.

The voice activity detection unit (VAD) 42 can further be configured to detect a voice signal only when the signal-to-noise ratio and/or the sound level of a detected voice are above a predetermined threshold. The voice activity detection unit 42 operating in the communication mode can also be configured to continuously detect whether a voice signal is present in the electrical sound signal 35, independent of the wireless sound input 18 receiving a wireless sound signal 19.

Figure 3:
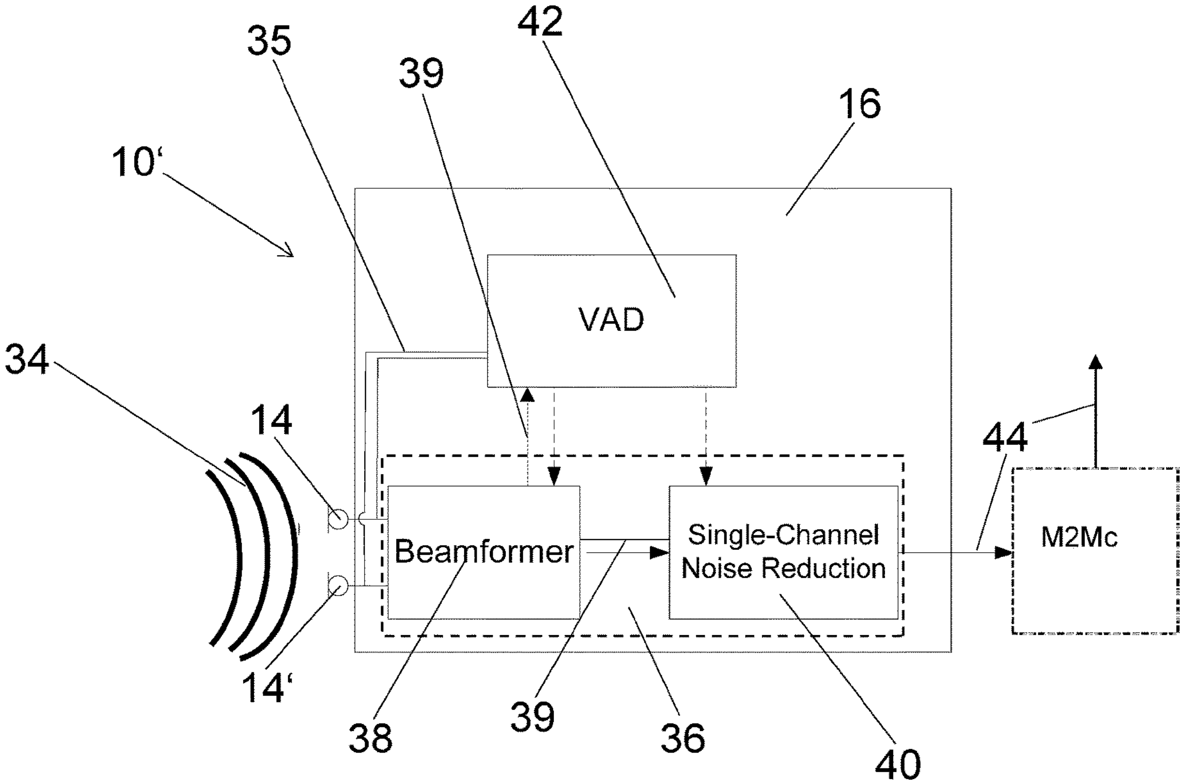
FIG. 3 shows a schematic illustration of a portion of a second embodiment of a hearing aid device.

The voice activity detection unit (VAD) 42 indicates to the beamformer 38 if a voice signal is present in at least one of the electrical sound signals 35, i.e., in the user speaking mode (dashed arrow from VAD 42 to Beamformer 38 in FIG. 3). The beamformer 38 suppresses spatial directions in dependence of predetermined spatial direction parameters, i.e., the look vector and generates a spatial sound signal 39 (see FIG. 3).

The spatial sound signal 39 is provided to the single channel noise reduction unit (Single-Channel Noise Reduction) 40. The single channel noise reduction unit 40 uses a predetermined noise signal to reduce the noise in the spatial sound signal 39, e.g., by subtracting the predetermined noise signal from the spatial sound signal 39. The predetermined noise signal is for example an electrical sound signal 35, a spatial sound signal 39, or a processed combination thereof of a previous time period, in which a voice signal is absent in the respective sound signal or sound signals. The single channel noise reduction unit 40 generates a user voice signal 44, which is then provided to the transmitter unit 20 (cf. FIG. 1). Therefore the user 46 (cf. FIG. 2) can use the microphones 14 and 14' (cf. FIG. 1) of the hearing aid device 10 to communicate via the mobile phone 12 with another user on another mobile phone.

In other modes the hearing aid device 10 can for example be used as an ordinary hearing aid, e.g., in a normal listening mode, in which, e.g., the listening quality is optimized (cf. FIG. 1). The hearing aid device 10 in the normal listening mode receives incoming sound 34 by the microphones 14 and 14' which generate electrical sound signals 35. The electrical sound signals 35 are processed in the electric circuitry 16 by, e.g., amplification, noise reduction, spatial directionality selection, sound source localization, gain reduction/enhancement, frequency filtering, and/or other processing operations. An output sound signal is generated from the processed electrical sound signals, which is provided to the speaker 24, which generates an output sound 48. Instead of the speaker 24 the hearing aid device 10 can also comprise another form of output transducer, e.g., a vibrator of a bone anchored hearing aid device or electrodes of a cochlear implant hearing aid device which is configured to stimulate the hearing of the user 46.

The hearing aid device 10 further comprises a switch 50 to, e.g., select and control the modes of operation and a memory 52 to store data, such as the modes of operation, algorithms and other parameters, e.g., spatial direction parameters (cf. FIG. 1). The switch 50 can for example be controlled via a user interface, e.g. a button, a touch sensitive display, an implant connected to the brain functions of a user, a voice interacting interface or other kind of interface (e.g. a remote control, e.g. implemented via a display of a SmartPhone) used for activating and/or deactivating the switch 50. The switch 50 can for example be activated and/or deactivated by a code word spoken by the user, a blinking sequence of the eyes of the user, or by clicking a button which activates the switch 50.

The algorithm as described estimates the clean voice signal of the user (wearer) of the hearing aid device as picked up by a (or one or more) chosen microphone(s). However, for the far-end listener, the speech signal would sound more natural, if it were picked up in front of the mouth of the speaker (here the user of the hearing device). This is, of course, not completely possible, since we don't have a microphone positioned there, but we can in fact make a compensation to the output of our algorithm to simulate how it would sound if it were picked up in front of the mouth. This may be done simply by passing the output of our algorithm through a time-invariant linear filter, simulating the transfer function from microphone to mouth. This linear filter could be found from the dummy head in a completely analogous way to what we have done so far. Hence, in an embodiment, the hearing aid device comprises an (optional) post-processing block (M2Mc, microphone-to-mouth compensation) between the output of the current algorithm (Beamformer, Single-Channel Noise Reduction unit (38, 40)) and the transmitter unit (20), cf. dashed unit M2Mc in FIG. 3.

Figure 2:
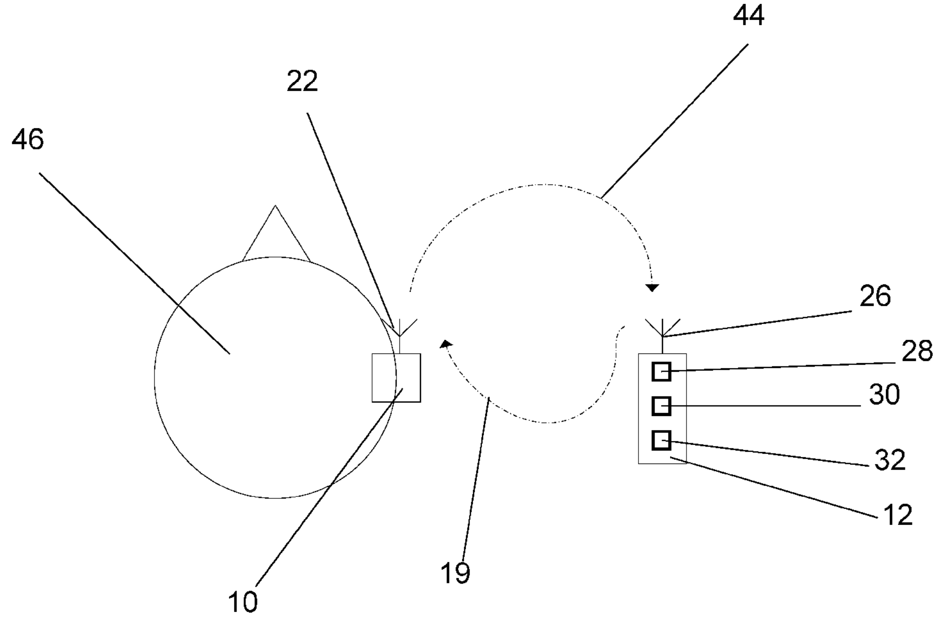
FIG. 2 shows a schematic illustration of the first embodiment of a hearing aid device worn by a user and wirelessly connected to a mobile phone.

FIG. 2 shows the hearing aid device 10 wirelessly connected to the mobile phone 12 presented in FIG. 1 worn at the ear of the user 46 in the communication mode. The hearing aid device 10 is configured to transmit user voice signals 44 to the mobile phone 12 and to receive wireless sound signals 19 from the mobile phone 12. This allows a hands free communication of the user 46 using the hearing aid device 10, while the mobile phone 12 can be left in a pocket or bag when in use and wirelessly connected to the hearing aid device 10. It is also possible to wirelessly connect the mobile phone 12 with two hearing aid devices 10 (e.g. constituting a binaural hearing aid system), e.g., on a left and on a right ear of the user 46 (not shown). In the binaural hearing aid system case the two hearing aid devices 10 preferably also are connected wirelessly with each other (e.g. by an inductive link or a link based on radiated fields (RF), e.g. according to the Bluetooth specification or equivalent) to exchange data and sound signals. The binaural hearing aid system preferably has at least four microphones, two microphones on each of the hearing aid devices 10.

In the following, an exemplary communication scenario is presented. A phone call reaches the user 46. The phone call is accepted by the user 46, e.g., by activating the switch 50 at the hearing aid device 10 (or via another user interface, e.g. a remote control, e.g. implemented in the user's mobile phone). The hearing aid device 10 activates the communication mode and connects wirelessly to the mobile phone 12. A wireless sound signal 19 is wirelessly transmitted from the mobile phone 12 to the hearing aid device 10 using the transmitter unit 28 of the mobile phone 12 and the wireless sound input 18 of the hearing aid device 10. The wireless sound signal 19 is provided to the speaker 24 of the hearing aid device 10, which generates an output sound 48 (see FIG. 1) to stimulate the hearing of the user 46. The user 46 responds by speaking. The user voice signal is picked up by the microphones 14 and 14' of the hearing aid device 10. Due to the distance of the mouth of the user 46, i.e., the target sound source 58 (see also FIG. 4), to the microphones 14 and 14', additional background noise is also picked up by the microphones 14 and 14', resulting in noisy sound signals reaching the microphones 14 and 14'. The microphones 14 and 14' generate noisy electrical sound signals from the noisy sound signals reaching the microphones 14 and 14'. Transmitting the noisy electrical sound signals 35 to another user using the mobile phone 12 without further processing would typically lead to poor conversation quality due to the noise, so processing is most often necessary. The noisy electrical sound signals 35 are processed by retrieving the user voice signal, i.e., own voice, from the electrical sound signals 35 using the dedicated own voice beamformer 38 (FIG. 1, 3). The output, i.e., spatial sound signal 39 of the beamformer 38 is further processed in the single chancel noise reduction unit 40. The resulting noise-reduced electrical sound signal 35, i.e., user voice signal 44, which ideally consists of mainly own voice, is transmitted to the mobile phone 12 and from the mobile phone 12 to another user using another mobile phone e.g. via a (public) switched (telephone and/or data) network.

The voice activity detection (VAD) algorithm or voice activity detection (VAD) unit 42 allows for adapting the user voice, i.e., own voice, retrieval system. The VAD 42 task in this particular situation is rather simple as a user voice signal 44 is likely absent, when a wireless sound signal 19 (having a certain signal content) is received by the wireless sound input 18. When the VAD 42 detects no user voice, in the electrical sound signals 35, while the wireless sound input 18 receives a wireless sound signal 19, a noise power spectral density (PSD) used in the single channel noise reduction unit 40 for reducing noise in the electrical sound signal 35 is updated (because it is assumed that the user is silent (while listening to a remote talker) and hence ambient sounds picked up the microphone(s) of the hearing aid device can be considered as noise (in the present situation)). The look vector in the beamforming algorithm or beamformer unit 38 can be updated as well. When the VAD 42 detects a user voice the beamformers spatial direction, i.e., the look vector is (or may be) updated. This allows the beamformer 38 to compensate for the variation (deviation) of the hearing aid users' head characteristics from a standard dummy head 56 (see FIG. 4), and to compensate for the variation of the exact mounting of the hearing aid device 10 on an ear from day to day. Beamformer designs exist and are known to the person skilled in the art which are independent of the exact microphone locations, in the sense that they aim at retrieving an own voice target sound signal, i.e., the user voice signal 44, in a minimum mean-square sense or in a minimum-variance distortionless response sense independent of the microphone geometry, see e.g. [Kjems & Jensen; 2012] (U. Kjems and J. Jensen, "Maximum Likelihood Based Noise Covariance Matrix Estimation for Multi-Microphone Speech Enhancement," Proc. Eusipco 2012, pp. 295-299).

FIG. 3 shows a second embodiment of a portion of a hearing aid device 10'. The hearing aid device 10' has two microphones 14 and 14', a voice activity detection unit (VAD) 42, and a dedicated beamformer-noise-reduction-system 36, comprising a beamformer 38 and a single-channel noise reduction unit 40.

The microphones 14 and 14' receive incoming sound 34 and generate electrical sound signals 35. The hearing aid device 10' has more than one signal transmission path to process the electrical sound signals 35 received by the microphones 14 and 14'. A first transmission path provides the electrical sound signals 35 as received by the microphones 14 and 14' to the voice activity detection unit 42, corresponding to the mode of operation presented in FIG. 1.

A second transmission path provides the electrical sound signals 35 as received by the microphones 14 and 14' to the beamformer 38. The beamformer 38 suppresses spatial directions in the electrical sound signals 35 using the predetermined spatial direction parameters, i.e., the look vector, to generate a spatial sound signal 39. The spatial sound signal 39 is provided to the voice activity detection unit 42 and the single channel noise reduction unit 40. The voice activity detection unit 42 determines whether a voice signal is present in the spatial sound signal 39. If a voice signal is present in the spatial sound signal 39 the voice activity detection unit 42 transmits a voice detected signal to the single channel noise reduction unit 40 and if no voice signal is present in the spatial sound signal 39 the voice activity detection unit 42 transmits a no voice detected signal to the single channel noise reduction unit 40 (cf. dashed arrow from VAD 42 to Single-Channel Noise Reduction 40 in FIG. 3. The single channel noise reduction unit 40 generates a user voice signal 44 when it receives a voice detected signal from the voice activity detection unit 42 by subtracting a predetermined noise signal from the spatial sound signal 39 received from the beamformer 38 or a (e.g. adaptively updated) noise signal corresponding to the spatial sound signal 39 when it receives a no voice detected signal. The predetermined noise signal corresponds e.g. to a spatial sound signal 39 without voice signal, which was received in an earlier time interval. The user voice signal 44 can be supplied to a transmitter unit 20 to be transmitted to a mobile phone 12 (not shown). As described in connection with FIG. 1, the hearing aid device may comprise an (optional) post-processing block (M2Mc, dashed outline) providing a microphone-to-mouth compensation, e.g. using a time-invariant linear filter, simulating the transfer function from an (imaginary centrally and frontally located) microphone to the mouth.

In a normal listening mode, the environment sound picked up by microphones 14, 14' may be processed by a beamformer and noise reduction system (but with other parameters, e.g. another look vector (not aiming at the user's mouth), e.g. an adaptively determined look vector depending on the current sound field around the user/hearing aid device) and further processed in a signal processing unit (electric circuitry 16) before being presented to the user via an output transducer (e.g. speaker 24 in FIG. 1).

In the following, the dedicated beamformer-noise-reduction-system 36 comprising the beamformer 38 and the single channel noise reduction unit 40 is described in more detail. The beamformer 38, the single channel noise reduction unit 40, and the voice activity detection unit 42 are considered to be algorithms in the following which are stored in the memory 52 and executed on the electric circuitry 16 (cf. FIG. 1). The memory 52 is further configured to store the parameters used and described in the following, e.g., the predetermined spatial direction parameters (transfer functions) adapted to cause a beamformer 38 to suppress sound from other spatial directions than the spatial directions determined by values of the predetermined spatial direction parameters, such as the look vector, an inter-environment sound input noise covariance matrix for the current acoustic environment, a beamformer weight vector, a target sound covariance matrix, or further predetermined spatial direction parameters.

The beamformer 38 can for example be a generalized sidelobe canceller (GSC), a minimum variance distortionless response (MVDR) beamformer 38, a fixed look vector beamformer 38, a dynamic look vector beamformer 38, or any other beamformer type known to a person skilled in the art.

A so-called minimum variance distortionless response (MVDR) beamformer 38, see, e.g., [Kjems & Jensen; 2012] or [Haykin; 1996] (S. Haykin, "Adaptive Filter Theory," Third Edition, Prentice Hall International Inc., 1996), can generally be described by the MVDR beamformer weight vector $W_H$, as follows $$W_H(k) = \frac{\hat{R}_{VV}(k)\hat{d}(k)\hat{d}^*(k, i_{ref})}{\hat{d}^H(k)\hat{R}_{VV}^{-1}(k)\hat{d}(k)}$$

where $\hat{R}_{VV}(k)$ is (an estimate of) the inter-microphone noise covariance matrix for the current acoustic environment, $\hat{d}(k)$ is the estimated look vector (representing the inter-microphone transfer function for a target sound source at a given location), k is a frequency index and $i_{ref}$ is an index of a reference microphone (* denotes complex conjugate, and $^H$ denotes Hermitian transposition). It can be shown that this beamformer 38 minimizes the noise power in its output, i.e., the spatial sound signal 39, under the constraint that a target sound component, i.e., the voice of the user 46, is unchanged, see, e.g., [Haykin; 1996]. The look vector d represents the ratio of transfer functions corresponding to the direct part, i.e., first 20 ms, of room impulse responses from the target sound source 58, e.g., the mouth of a user 46 (see FIG. 4, where 'user' 46 is dummy head 56), to each of M microphones, e.g., the two microphones 14 and 14' of the hearing aid device 10 located at an ear of the user 46. The look vector is normalized so that $d^H d=1$, and is computed as the eigenvector corresponding to the largest eigenvalue of the covariance matrix $\hat{R}_{SS}(k)$, i.e., the inter-microphone target sound signal covariance matrix (s referring to microphone signal s).

A second embodiment of the beamformer 38 is a fixed look vector beamformer 38. A fixed look vector beamformer 38 from a user's mouth, i.e., target sound source 58, to the microphones 14 and 14' of the hearing aid device 10 can, e.g., be implemented by determining a fixed look vector $d=d_0$ (e.g. using an artificial dummy head 56 (see FIG. 4), e.g., the Head and Torso Simulator (HATS) 4128C from Brüel & Kjær Sound & Vibration Measurement A/S), and using such fixed look vector $d_0$ (defining the target sound source 58 to microphone 14, 14' configuration, which is relatively identical from one user 46 to another user) together with a dynamically determined inter-microphone noise covariance matrix for the current acoustic environment $\hat{R}_{VV}(k)$ (thereby taking into account a dynamically varying acoustic environment (different (noise) sources, different location of (noise) sources over time)). A calibration sound, i.e., training voice signals 60 or training signals (see FIG. 4), preferably comprising all relevant frequencies, e.g., a white noise signal having frequency content between a minimum frequency of, e.g., above 20 Hz and a maximum frequency of, e.g., below 20 kHz is emitted from the target sound source 58 of the dummy head 56 (see FIG. 4), and signals $s_m(n,k)$ (n being a time index and k a frequency index) are picked up by the microphones 14 and 14' (m=1, . . . , M, here, e.g., M=2 microphones) of the hearing aid device 10' when located at or in an ear of the dummy head 56. The resulting inter-microphone covariance matrix $\hat{R}_{SS}(k)$ is estimated for each frequency k based on the training signal $$\hat{R}_{SS}(k) = \frac{1}{N}\sum_n s(n, k)s^H(n, k),$$

where $s(n,k)=[s(n,k,1)s(n,k,2)]^T$ and s(n,k, m) is the output of an analysis filter bank, for microphone m, at time frame n and frequency index k. For a true point sound source, the signal impinging on the microphones 14 and 14' or on a microphone array would be of the form $s(n,k)=s(n,k)d(k)$ such that (assuming that signal s(n,k) is stationary) the theoretical target covariance matrix $R_{SS}(k)=E[s(n,k)s^H(n,k)]$ would be of the form $$R_{SS}(k)=\phi_{SS}(k)d(k)d^H(k),$$

where $\phi_{SS}(k)$ is the power spectral density of the target sound signal, i.e., the voice of the user 46 coming from the target sound source 58, meaning the user voice signal 44, observed at the reference microphone 14. Therefore, the eigenvector of $R_{SS}(k)$ corresponding to the non-zero eigenvalue is proportional to d(k). Hence, the look vector estimate $\hat{d}(k)$, e.g., the relative target sound source 58 to microphone 14, i.e., mouth to ear transfer function $\hat{d}_0(k)$, is defined as the eigenvector corresponding to the largest eigenvalue of the estimated target covariance matrix $\hat{R}_{ss}(k)$. In an embodiment, the look vector is normalized to unit length, that is:

$$d(k) := \frac{d(k)}{\sqrt{d^H(k)\,d(k)}},$$

such that $\|d\|^2=1$. The look vector estimate $\hat{d}(k)$ thus encodes the physical direction and distance of the target sound source 58, it is therefore also called the look direction. The fixed, pre-determined look vector estimate $\hat{d}_0(k)$ can now be combined with an estimate of the inter-microphone noise covariance matrix $\hat{R}_{VV}(k)$ to find MVDR beamformer weights (see above).

In a third embodiment, the look vector can be dynamically determined and updated by a dynamic look vector beamformer 38. This is desirable in order to take into account physical characteristics of the user 46 which differ from those of the dummy head 56, e.g., head form, head symmetry, or other physical characteristics of the user 46. Instead of using a fixed look vector $d_0$, as determined by using the artificial dummy head 56, e.g. HATS (see FIG. 4), the above described procedure for determining the fixed look vector can be used during time segments where the user's own voice, i.e., the user voice signal, is present (instead of the training voice signal 60) to dynamically determine a look vector d for the user's head and actual mouth to hearing aid device microphone(s) 14, 14' arrangement. To determine these own-voice dominated time-frequency regions, a voice activity detection (VAD) 42 algorithm can be run on the output of the own-voice beamformer 38, i.e., the spatial sound signal 39, and target speech inter-microphone covariance matrices estimated (as above) based on the spatial sound signal 39 generated by the beamformer 38. Finally, the dynamic look vector can be determined as the eigenvector corresponding to the dominant eigenvalue. As this procedure involves VAD decisions based on noisy signal regions, some classification errors can occur. To avoid that these influence algorithm performance, the estimated look vector can be compared to the predetermined look vector and/or predetermined spatial direction parameters estimated on the HATS. If the look vectors differ significantly, i.e., if their difference is not physically plausible, the predetermined look vector is preferably used instead of the look vector determined for the user 46. Clearly, many variations on the look vector selection mechanism can be envisioned, e.g., using a linear combination of the predetermined fixed look vector and the dynamically estimated look vector, or other combinations.

The beamformer 38 provides an enhanced target sound signal (here focusing on the user's own voice) comprising the clean target sound signal, i.e., the user voice signal 44, (e.g., because of the distortionless property of the MVDR beamformer 38), and additive residual noise, which the beamformer 38 was unable to completely suppress. This residual noise can be further suppressed in a single-channel post filtering step using the single channel noise reduction unit 40 or a single channel noise reduction algorithm executed on the electric circuitry 16. Most single channel noise reduction algorithms suppress time-frequency regions where the target sound signal-to-residual noise ratio (SNR) is low, while leaving high-SNR regions unchanged, hence an estimate of this SNR is needed. The power spectral density (PSD)

$$\sigma_w^2(k, m)$$

of the noise entering the single-channel noise reduction unit 40 can be expressed as $$\sigma_w^2(k, m) = w^H(k, m)\hat{R}_{VV}w(k, m)$$

Given this noise PSD estimate, the PSD of the target sound signal, i.e., user voice signal 44, can be estimated as $$\hat{\sigma}_s^2(k, m) = \sigma_x^2(k, m)\hat{\sigma}_w^2(k, m).$$

The ratio of $$\hat{\sigma}_s^2(k, m)$$

and $$\hat{\sigma}_w^2(k, m)$$

forms an estimate of the SNR at a particular time-frequency point. This SNR estimate can be used to find the gain of the single channel reduction unit 40, e.g., a Wiener filter, an mmse-stsa optimal gain, or the like, see, e.g., P. C. Loizou, "Speech Enhancement: Theory and Practice," Second Edition, CRC Press, 2013 and the references therein.

The described own-voice beamformer estimates the clean own-voice signal as observed by one of the microphones. This sounds slightly strange, and the far-end listener may be more interested in the voice signal as measured at the mouth of the HA user. Obviously, we don't have a microphone located at the mouth, but since the acoustical transfer function from mouth to microphone is roughly stationary, it is possible to make a compensation (pass the current output signal through a linear time-invariant filter) which emulates the transfer function from microphone to mouth.

Figure 4:
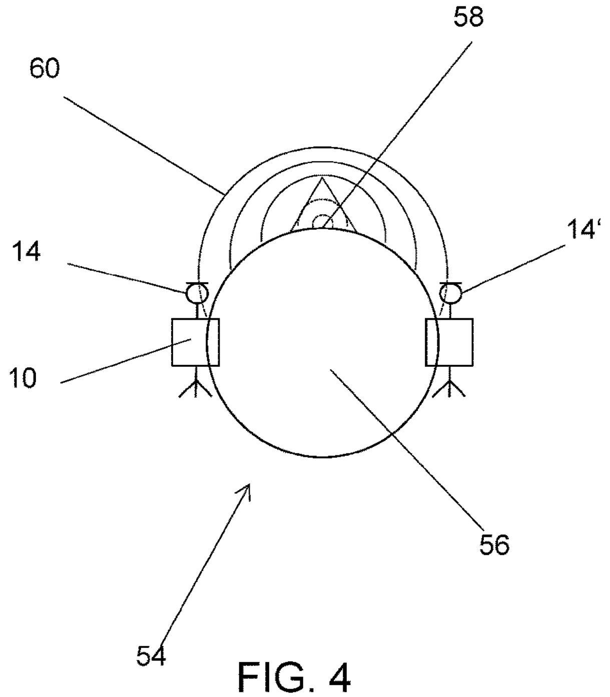
FIG. 4 shows a schematic illustration of a first embodiment of a hearing aid device worn by a dummy head in a beamformer dummy head model system.

FIG. 4 shows a beamformer dummy head model system 54 with two hearing aid devices 10 mounted on a dummy head 56. The hearing aid devices 10 are mounted at the sides of the dummy head 56 at locations corresponding to ears of a user. The dummy head 56 has a dummy target sound source 58 that produces training voice signals 60 and/or training signals. The dummy target sound source 58 is located at a location corresponding to a mouth of a user. The training voice signals 60 are received by the microphones 14 and 14' and can be used to determine the location of the target sound source 58 relative to the microphones 14 and 14'. An adaptive beamformer 38 (referring now to FIG. 4: you need (at least) two mics 14 and 14' to be able to make a beamformer in each hearing aid device or alternatively one microphone in each hearing aid device of a binaural hearing aid system (binaural beamformer)) in each of the hearing aid devices 10 is configured to determine the look vector, (i.e. a (relative) acoustic transfer function from source to microphone(s)) while the hearing aid device 10 is in operation and while a training voice signal 60 is present in the spatial sound signal 39. The electric circuitry 16 estimates training voice inter-microphone covariance matrices and determines an eigenvector corresponding to a dominant eigenvalue of the covariance matrix, when the training voice signal 60 is detected. The eigenvector corresponding to the dominant eigenvalue of the covariance matrix is the look vector d (eigenvector is one way). The look vector depends on the relative location of the dummy target sound source 58 relative to the microphones 14 and 14'. The look vector therefore represents an estimate of the transfer function from the dummy target sound source 58 to the microphones 14 and 14'. The dummy head 56 is chosen in correspondence to an average human head, taking into account female and male heads. The look vector can also be gender specifically determined by using a corresponding female and/or male (or child-specific) dummy head 56, corresponding to an average female or male (or child) head.

Figure 5:
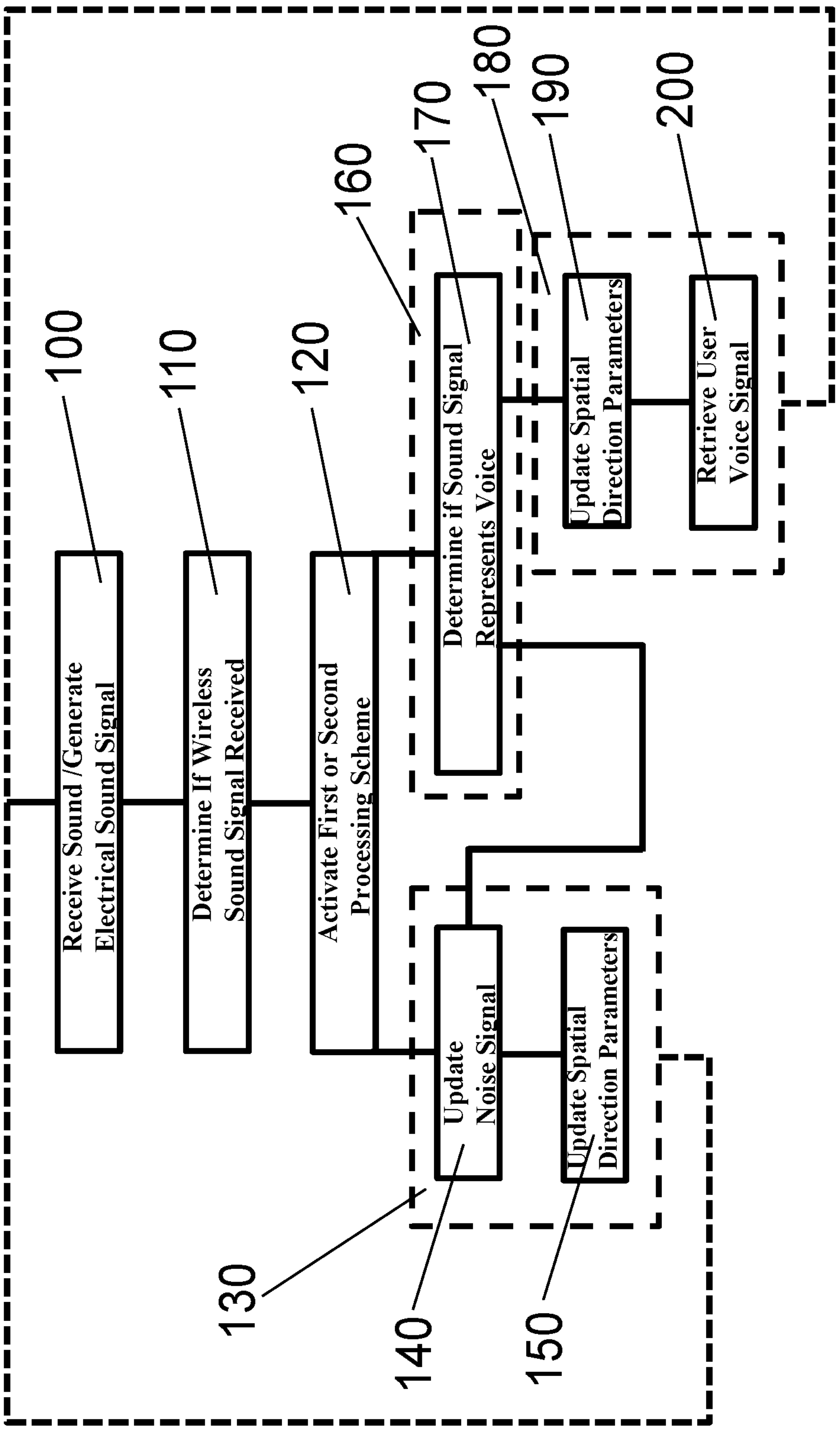
FIG. 5 shows a block diagram of a first embodiment of a method for using a hearing aid device connectable to a communication device.

FIG. 5 shows a first embodiment of a method for using a hearing aid device 10 or 10' connected to a communication device, e.g., the mobile phone 12. The method comprises the steps:

- 100 receiving sound 34 and generating electrical sound signals 35 representing sound 34,
- 110 determining if a wireless sound signal 19 is received,
- 120 activating a first processing scheme 130 if a wireless sound signal 19 is received and activating a second processing scheme 160 if no wireless sound signal 19 is received.

The first processing scheme 130 comprises the steps 140 and 150.

- 140 using the electrical sound signals 35 to update a noise signal representing noise used for noise reduction,
- 150 using the noise signal to update values of predetermined spatial direction parameters.

(In an embodiment, steps 140 and 150 are combined to update an inter-microphone noise-only covariance matrix)

The second processing scheme 160 comprises the step 170.

- 170 determining if the electrical sound signals 35 comprise a voice signal representing voice and activating the first processing scheme 130 if a voice signal is absent in the electrical sound signals 35 and activating a noise reduction scheme 180 if the electrical sound signals 35 comprise a voice signal.

The noise reduction scheme 180 comprises the steps 190 and 200.

- 190 using the electrical sound signals 35 to update the values of the predetermined spatial direction parameters (if near-end speech is dominant, update estimate of own-voice inter-microphone covariance matrix and then find (e.g.) the dominant eigenvector=(relative) transfer function from source to microphone(s)),
- 200 retrieving a user voice signal 44 representing the user voice from the electrical sound signals 35. Preferably a spatial sound signal 39 representing spatial sound is generated from the electrical sound signals 35 using the predetermined spatial direction parameters and a user voice signal 44 is generated from the spatial sound signal 39 using (e.g.) the noise signal to reduce noise in the spatial sound signal 39.

Optionally the user voice signal can be transmitted to, e.g., a communication device such as a mobile phone 12 wirelessly connected to the hearing aid device 10. The method can be performed continuously by starting again at step 100 after step 150 or step 200.

Figure 6:
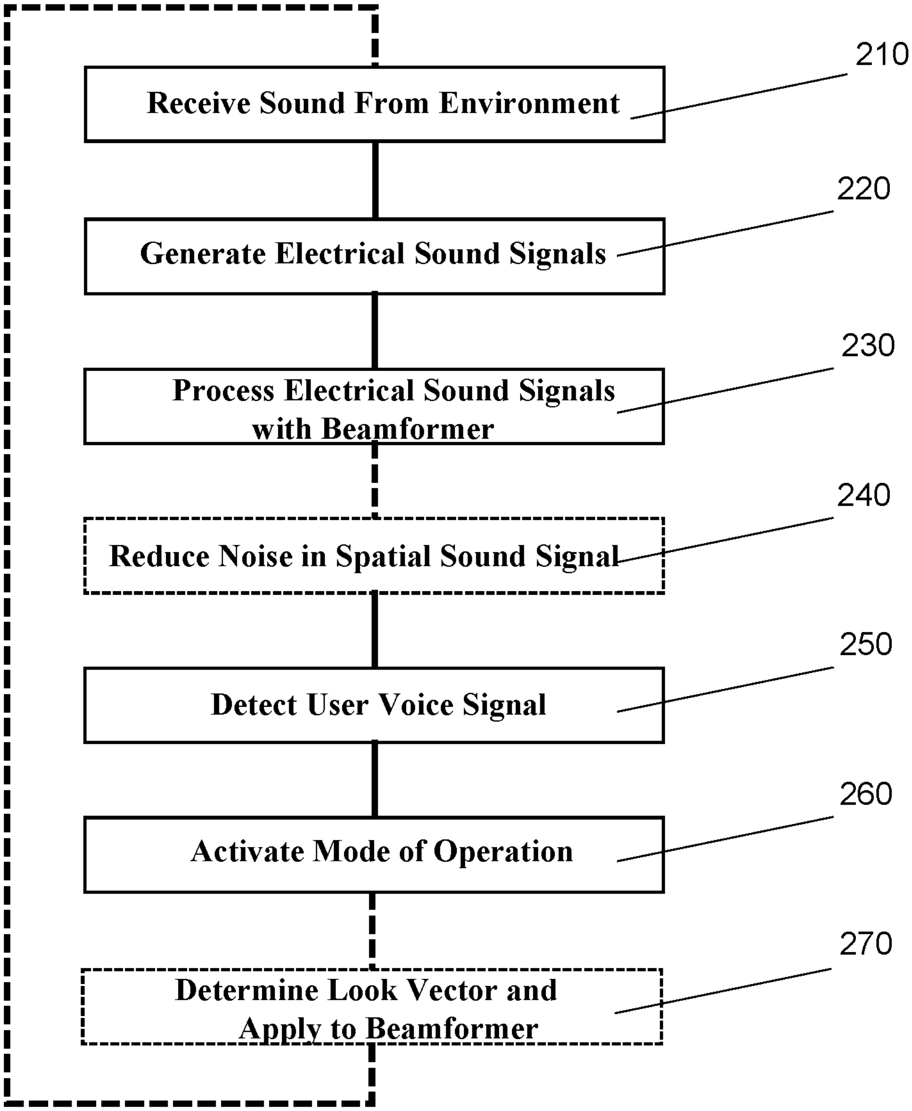
FIG. 6 shows a block diagram of a second embodiment of a method for using a hearing aid device.

FIG. 6 shows a second embodiment of a method for using the hearing aid device 10. The method shown in FIG. 6 uses the hearing aid device 10 as an own-voice detector. The method presented in FIG. 6 comprises the following steps.

- 210 Receive sound 34 from the environment in the microphones 14 and 14'.
- 220 Generate electrical sound signals 35 representing the sound 34 from the environment.
- 230 Use of the beamformer 38 to process the electrical sound signals 35, which generates a spatial sound signal 39 corresponding to predetermined spatial direction parameters, i.e., corresponding to the look vector d.
- 240 An optional step (dashed outline in FIG. 6) can be to use the single channel noise reduction unit 40 to reduce noise in the spatial sound signal 39 to increase the signal-to-noise ratio of the spatial sound signal 39, e.g., by subtracting a predetermined spatial noise signal from the spatial sound signal 39. A predetermined spatial noise signal can be determined by determining a spatial sound signal 39 when a voice signal is absent in the spatial sound signal 39, meaning when the user 46 is not speaking.
- 250 Use of the voice activity detection unit 42 to detect whether a user voice signal 44 of a user 46 is present in the spatial sound signal 39. Alternatively the voice activity detection unit 42 can also be used to determine whether the user voice signal 44 of the user 46 overcomes a signal-to-noise ratio threshold and/or sound signal level threshold.
- 260 Activate a mode of operation in dependence of the output of the voice activity detection unit 42, i.e., activating the normal listening mode, if no voice signal is present in the spatial sound signal 39 and activating the user speaking mode, if a voice signal is present in the spatial sound signal 39. If a wireless sound signal 19 is received additionally to the voice signal in the spatial sound signal 39 the method is preferably adapted to activate the communication mode and/or the user speaking mode.

Additionally the beamformer 38 can be an adaptive beamformer 38. In this case the method is used for training the hearing aid device 10 as an own-voice detector and the method further comprises the following steps.

- 270 If a voice signal is present in the spatial sound signal 39, determine an estimate of the user voice inter-environment sound input covariance matrices and the eigenvector corresponding to the dominant eigenvalue of the covariance matrix. This eigenvector is the look vector. The look vector is then applied to the adaptive beamformer 38 to improve the spatial direction of the adaptive beamformer 38. The adaptive beamformer 38 is used to determine a new spatial sound signal 39. In this embodiment the sound 34 is obtained continuously. The electrical sound signal 35 can be sampled or supplied as a continuous electrical sound signal 35 to the beamformer 38.

The beamformer 38 can be an algorithm performed on the electric circuitry 16 or a unit in the hearing aid device 10. The method can also be performed independent of the hearing aid device on any other suitable device. The method can be iteratively performed, e.g., by starting again at step 210 after performing step 270.

In the above examples, the hearing aid device(s) communicate(s) directly with a mobile phone. Other embodiments, where the hearing aid device(s) communicate(s) with the mobile phone VIA an intermediate device is also intended to be within the scope of the accompanying claims. The user advantage is that, whereas today the mobile phone or the intermediate device must be held in a hand or worn in a string around the neck so that its microphone is just below the mouth, with the proposed invention, the mobile phone and/or the intermediate device may be covered by clothes or carried in a pocket. This is convenient and has the benefit that the user does not need to flash that he wears a hearing aid device.

In the above examples, the processing (electric circuitry 16) of the input sound signals (from microphone(s) and wireless receiver) is generally assumed to be located in the hearing aid device. In case of sufficient available bandwidth for transmitting audio signals 'back and forth', such processing (e.g. including beamforming and noise reduction) may be located in an external device, e.g. an intermediate device or a mobile telephone device. Thereby power and space can be saved in the hearing aid device; such parameters typically both being limited in a state of the art hearing aid device.

REFERENCE SIGNS

10 hearing aid device
12 mobile phone
14 microphone
16 electric circuitry
18 wireless sound input
19 wireless sound signal
20 transmitter unit
22 antenna
24 speaker
26 antenna
28 transmitter unit
30 receiver unit
32 interface to public telephone network
34 incoming sound
35 electrical sound signal representing sound
36 dedicated beamformer-noise-reduction-system
38 beamformer
39 spatial sound signal
40 single channel noise reduction unit
42 voice activity detection unit
44 user voice signal
46 user
48 output sound
50 switch
52 memory
54 dummy head model system
56 dummy head
58 target sound source
60 training voice signal

The invention claimed is:

1. A hearing aid comprising:

a microphone configured to obtain sounds in an environment around the hearing aid and convert the sounds into an electrical signal representative of the sounds;

a voice-activity detection unit configured to receive the electrical signal and to determine whether a voice-activity is present in the electrical signal;

an auditory output configured to output the electrical signal to a user as an auditory signal; and interface circuitry configured to wirelessly communicate with a mobile telephone; and wherein the hearing aid is configured to, based on a determination of whether the voice-activity is present, operate in at least one of:

a hearing-aid mode wherein the hearing aid is disconnected from the mobile telephone, the hearing-aid mode having a first processing scheme; and a speaker mode wherein the hearing aid is configured to wirelessly communicate with the mobile telephone and receive sound data from the mobile telephone and output the sound data via the auditory output, the speaker mode having a second processing scheme, the second processing scheme being different than the first processing scheme.

2. The hearing aid of claim 1, wherein the hearing aid is configured to estimate a noise power spectral density of the sounds in the environment, and wherein the hearing aid is configured to, based on the noise power spectral density and the determination of whether the voice-activity is present, attenuate further sounds obtained by the microphone.

3. The hearing aid of claim 1, wherein the second processing scheme is configured to attenuate disturbing sounds while maintaining selected sounds implying danger.

4. The hearing aid of claim 1, further comprising a beamformer-noise-reduction-system comprising a beamformer configured to suppress predetermined spatial directions of the sounds.

5. The hearing aid of claim 4, wherein the beamformer is configured to attenuate predetermined spatial directions of the sounds based on the determination of whether the voice-activity is present.

6. The hearing aid of claim 1, wherein the interface circuitry is configured to wirelessly communicate with the mobile telephone via an intermediate device.

7. The hearing aid of claim 6, wherein the intermediate device is a remote control, and wherein the hearing aid is configured to receive control signals from the remote control.

8. The hearing aid of claim 1, wherein the hearing aid is configured to receive user input and the hearing aid is configured to operate in the hearing-aid mode or the speaker mode based on the user input.

9. The hearing aid of claim 1, wherein the hearing aid is configured to receive user input indicative of a selection of the hearing-aid mode or the speaker mode, and wherein the hearing aid is configured to operate based on the selection.

10. The hearing aid of claim 1, wherein the hearing-aid mode comprises a plurality of secondary hearing-aid modes, each of the plurality of secondary hearing-aid modes having different operation parameters for the hearing aid.

11. The hearing aid of claim 1, wherein, in the speaker mode, the hearing aid is configured to attenuate the sounds in the environment.

12. The hearing aid of claim 1, wherein, in the speaker mode, the hearing aid is obtaining audio from both the environment and the mobile telephone.

13. The hearing aid of claim 12, wherein in the speaker mode the hearing aid is configured to combine the audio from both the environment and the mobile telephone.

14. The hearing aid of claim 1, wherein the hearing aid comprises a switch configured to establish wireless communication with the mobile telephone.

15. A system comprising a hearing aid according to claim 1, and a communication unit configured as a remote control to control functionality of the hearing aid.

16. A system of claim 15, wherein the communication unit is the mobile telephone, wherein the function as a remote control is implemented as an application in the mobile telephone.

17. The hearing aid of claim 1, wherein the auditory output comprises one or more of a loudspeaker for outputting an airborne acoustic signal, an implanted vibrator, and an implanted electrical stimulator.

18. The hearing aid of claim 1, wherein the voice-activity detection unit is configured determine a probability of whether a voice-activity is present in the electrical signal.

19. A hearing aid comprising:

a microphone configured to obtain sounds in an environment around the hearing aid and convert the sounds into an electrical signal representative of the sounds;

a voice-activity detection unit configured to receive the electrical signal and to determine whether a voice-activity is present in the electrical signal;

an auditory output configured to output the electrical signal to a user as an auditory signal; and interface circuitry configured to wirelessly communicate with a telephone network; and wherein the hearing aid is configured to, based on a determination of whether the voice-activity is present, operate in at least one of:

a hearing-aid mode wherein the hearing aid is disconnected from the telephone network, the hearing-aid mode having a first processing scheme; and a speaker mode wherein the hearing aid is configured to wirelessly communicate with the telephone network and receive sound data from the telephone network and output the sound data via the auditory output, the speaker mode having a second processing scheme, the second processing scheme being different than the first processing scheme.

20. The hearing aid according to claim 19, wherein the interface circuitry is configured to wirelessly communicate with the telephone network via a mobile telephone.

* * * * *